(12) United States Patent
Kikuchi et al.

(10) Patent No.: US 7,358,699 B2
(45) Date of Patent: Apr. 15, 2008

(54) ROTATING ELECTRIC MACHINE WITH BUILT-IN CONTROL DEVICE

(75) Inventors: Masao Kikuchi, Tokyo (JP); Isao Sonoda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 56 days.

(21) Appl. No.: 10/580,188

(22) PCT Filed: Jun. 16, 2005

(86) PCT No.: PCT/JP2005/011011

§ 371 (c)(1),
(2), (4) Date: May 23, 2006

(87) PCT Pub. No.: WO2006/008897

PCT Pub. Date: Jan. 26, 2006

(65) Prior Publication Data

US 2007/0103101 A1  May 10, 2007

(30) Foreign Application Priority Data

Jul. 15, 2004  (JP) ............................. 2004-208378

(51) Int. Cl.
*H02P 1/24* (2006.01)
(52) U.S. Cl. ...................... 318/727; 318/254; 318/138; 318/439; 310/113; 310/114
(58) Field of Classification Search ................ 318/727, 318/254, 439, 138; 310/113, 114
See application file for complete search history.

(56) References Cited

U.S. PATENT DOCUMENTS

| | | | | |
|---|---|---|---|---|
| 4,336,485 A | * | 6/1982 | Stroud | ......................... 320/126 |
| 5,650,713 A | * | 7/1997 | Takeuchi et al. | ............... 322/16 |
| 6,528,967 B2 | * | 3/2003 | Hallidy | ........................ 318/808 |
| 6,977,475 B2 | | 12/2005 | Kuribayashi et al. | |
| 2003/0141854 A1 | | 7/2003 | Kuribayashi et al. | |

FOREIGN PATENT DOCUMENTS

| | | |
|---|---|---|
| JP | 70469/1994 | 9/1994 |
| JP | 9-178147 A | 7/1997 |
| JP | 9-252563 A | 9/1997 |
| JP | 10-234158 A | 9/1998 |
| JP | 11-234954 A | 8/1999 |
| JP | 2003/116282 A | 4/2003 |
| JP | 2003-225000 A | 8/2003 |
| JP | 2003-259600 A | 9/2003 |
| JP | 2003-348781 A | 12/2003 |

\* cited by examiner

*Primary Examiner*—Rina Duda
(74) *Attorney, Agent, or Firm*—Sughrue Mion, PLLC (57) ABSTRACT

The invention is intended to obtain a rotating electric machine with a built-in control device in which the control device is kept from receiving heat from a main body of the rotating electric machine and the control device can be cooled in a desirable fashion. A heat sink (13) on which switching devices (12) of a control device (400) are mounted is attached to a rear bracket (6) by means of conductive studs (300) with a particular spacing provided in a left-to-right direction of FIG. 2. The heat sink (13) is cooled by a flow of cooling air induced by an unillustrated fan. Since the control device (400) is attached to the rear bracket (6) of which temperature increases with the spacing provided therefrom, it is possible to suppress heat transfer from the rear bracket (6) and effectively cool the control device (400) through the heat sink (13).

9 Claims, 11 Drawing Sheets

→ COOLING AIR
⇨ HEAT CONDUCTION

ROTATING ELECTRIC MACHINE WITH BUILT-IN CONTROL DEVICE

TECHNICAL FIELD

The present invention relates to a rotating electric machine with a built-in control device and, more particularly, to a rotating electric machine with a built-in control device suited for installation on a vehicle.

BACKGROUND ART

A currently available rotating electric machine with a built-in control device for onboard installation is as follows. A stator provided with coils is fixed to an inner surface of a frame. A pair of bearing brackets fixed to both sides of the frame supports a rotary shaft of a rotor via bearings. Of the aforementioned bearing brackets, the bearing bracket (rear bracket) located opposite a load side has radiating fins formed as integral parts of the bearing bracket to project from an outside surface thereof. An inverter device for operating the rotating electric machine at variable speeds is attached to the radiating fins.

A cooling fan is attached to a projecting end of the rotary shaft opposite the load side thereof, and a fan cover having an air inlet hole is attached to cover the cooling fan. There are formed ventilation openings between a peripheral part of the fan cover and a peripheral part of the bearing bracket. The cooling fan delivers cooling air to the radiating fins as a result of rotation of the rotating electric machine. The inverter device is formed into an annular shape as a whole and disposed concentrically around the rotary shaft. The inverter device includes a power unit provided with a ring-like radiating plate made of aluminum and a control circuit unit provided with a ringlike circuit board. The ring-like radiating plate is disposed on the radiating fins in a manner that enables thermal conduction, whereby heat generated by the power unit is dissipated (refer to patent document 1, for example).

Patent document 1: Japanese Patent Application Publication No. 1997-252563 (paragraphs 0015 to 0023 and FIG. 1)

DISCLOSURE OF THE INVENTION

Problems to be Solved by the Invention

In a rotating electric machine for onboard installation, particularly in an alternator, a great deal of heat is generated by copper loss and iron loss occurring in a rotor or a stator provided in a main body of the rotating electric machine. While the heat thus generated is dissipated by a flow of cooling air produced by a fan attached to the rotor, a stator core and stator coils reach fairly high temperatures. Since bearing brackets are fixed to a frame and the stator is fixed to an inner surface of the frame as mentioned above, the bearing brackets receive heat conducted from the stator of which temperature has risen through the frame. The bearing brackets also receive radiant heat from coil ends of the stator coils and the rotor of which temperature has risen. For this reason, the front and rear bearing brackets (i.e., the brackets on the load side and the side opposite the load side) reach considerably high temperatures.

The front and rear bearing brackets are susceptible to the influence of heat generation in the main body of the rotating electric machine as mentioned above. Therefore, if an inverter device including electronic components is affixed to radiating fins of the rear bracket, some of the electronic components might be heated beyond their permissible temperature range. If electronic components and a circuit board usable under high-temperature conditions are employed for the inverter device, on the other hand, there could arise a problem that this approach an overall cost increase would result because such components are expensive.

The present invention has been made to give a solution to the aforementioned problems. Accordingly, it is an object of the invention to obtain a rotating electric machine with a built-in control device in which the control device is kept from receiving heat from a main body of the rotating electric machine and the control device can be cooled in a desirable fashion.

Means for Solving the Problems

A rotating electric machine with a built-in control device according to the present invention includes a main body of the rotating electric machine including a stator, a rotor having a rotary shaft, brackets provided on both sides of the stator, one on a load side and the other on a side opposite the load side, for rotatably supporting the rotor via the rotary shaft, and a fan which is provided on the rotor and rotates together with the rotor to induce a flow of cooling air for cooling at least one of the stator and the rotor, and the control device including control components for controlling the main body of the rotating electric machine, the control device being fixed to the outside of the bracket on the side opposite the load side in an axial direction of the rotary shaft in such a manner that a particular spacing is formed between the control device and the bracket on the side opposite the load side and the flow of cooling air passes through this spacing.

ADVANTAGEOUS EFFECTS OF THE INVENTION

The rotating electric machine with the built-in control device according to the present invention includes the main body of the rotating electric machine including the stator, the rotor having the rotary shaft, the brackets provided on both sides of the stator, one on the load side and the other on the side opposite the load side, for rotatably supporting the rotor via the rotary shaft, and the fan which is provided on the rotor and rotates together with the rotor to induce the flow of cooling air for cooling at least one of the stator and the rotor, and the control device including the control components for controlling the main body of the rotating electric machine, the control device being fixed to the outside of the bracket on the side opposite the load side in the axial direction of the rotary shaft in such a manner that the particular spacing is formed between the control device and the bracket on the side opposite the load side and the flow of cooling air passes through this spacing. Thus, by providing the spacing between the control device and the bracket on the side opposite the load side, it is possible to suppress heat transfer from the bracket on the side opposite the load side and effectively cool the control device by the flow of cooling air.

BEST MODE FOR CARRYING OUT THE INVENTION

First Embodiment

Figure 1:
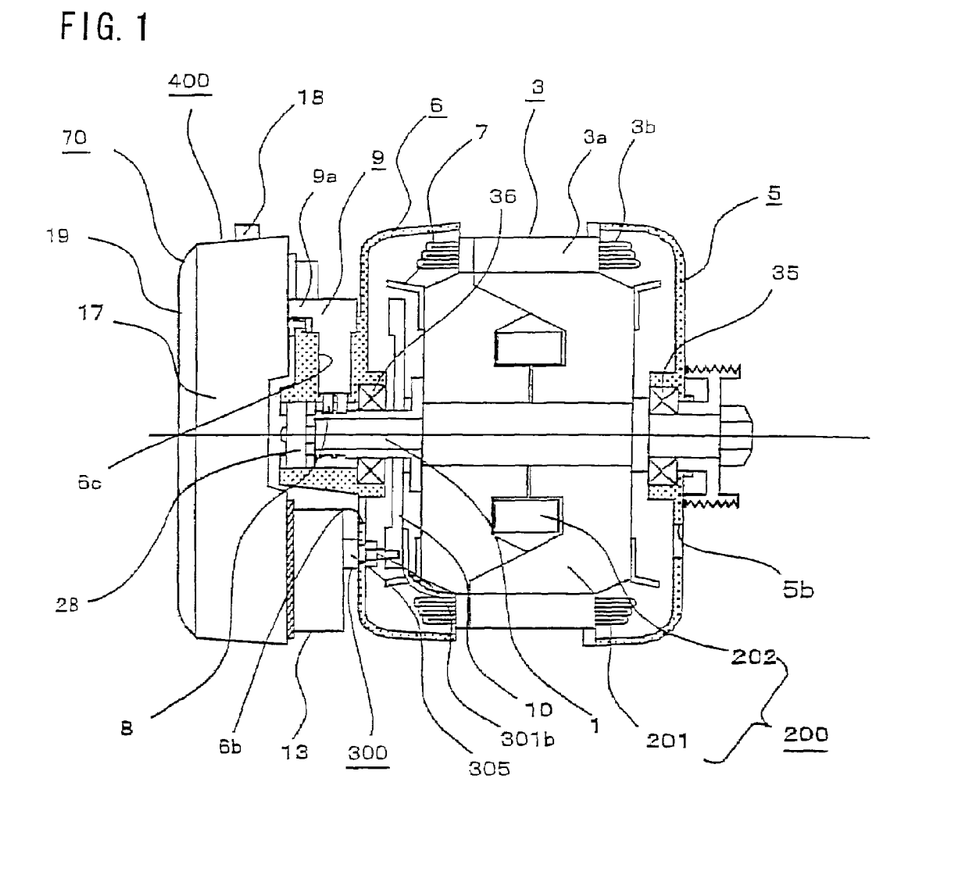
FIG. 1 is a fragmentary cross-sectional view showing the configuration of a rotating electric machine with a built-in control device according to a first embodiment of the present invention.
Figure 2:
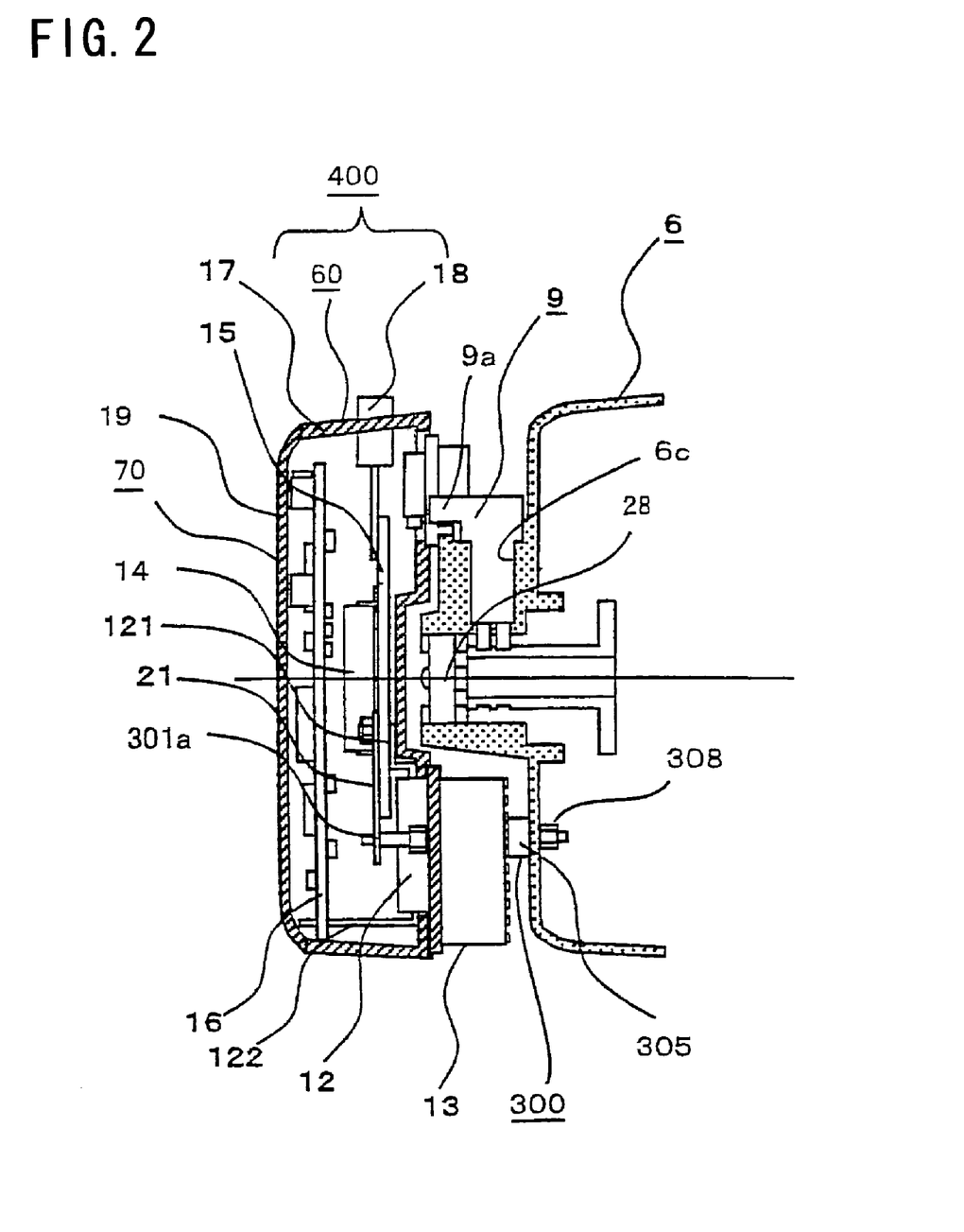
FIG. 2 is a cross-sectional view showing the detailed configuration of the control device.
Figure 3:
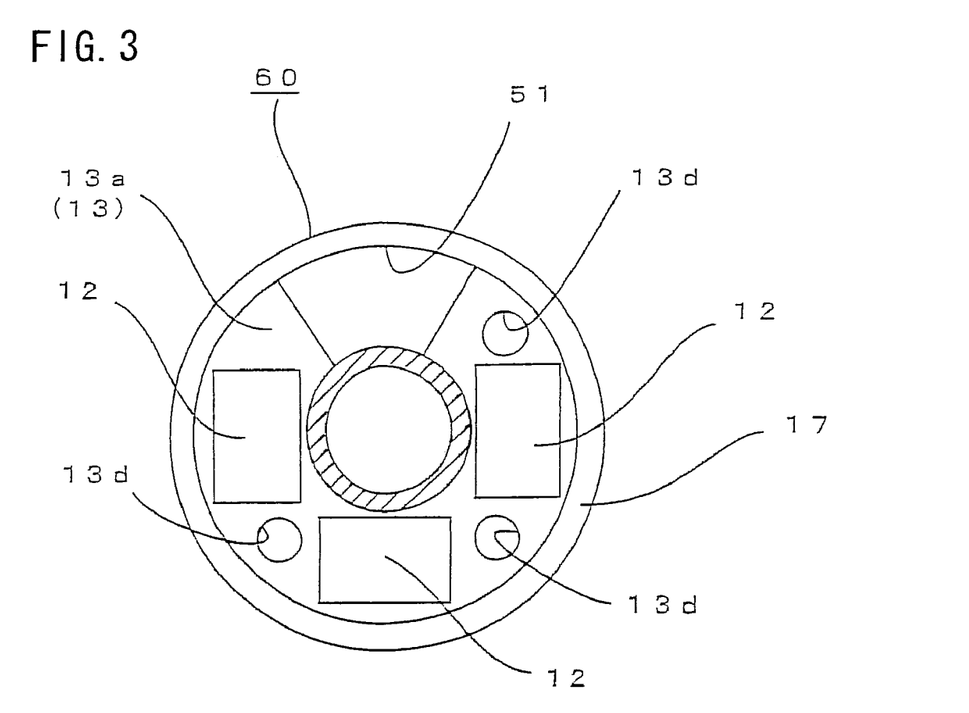
FIG. 3 is a plan view of a heat sink and a surrounding area to the heat sink.
Figure 4:
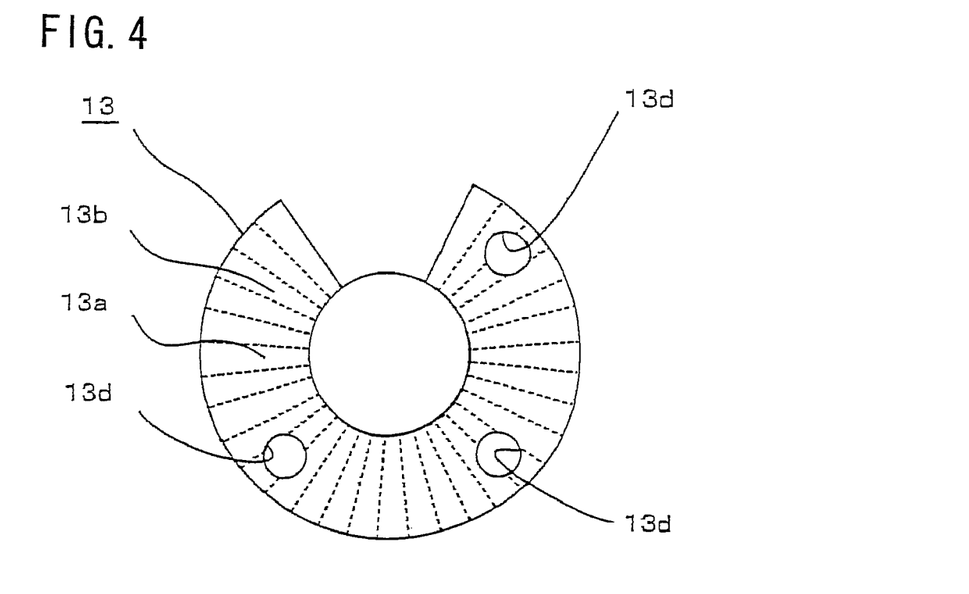
FIG. 4 is a plan view of the heat sink.
Figure 5:
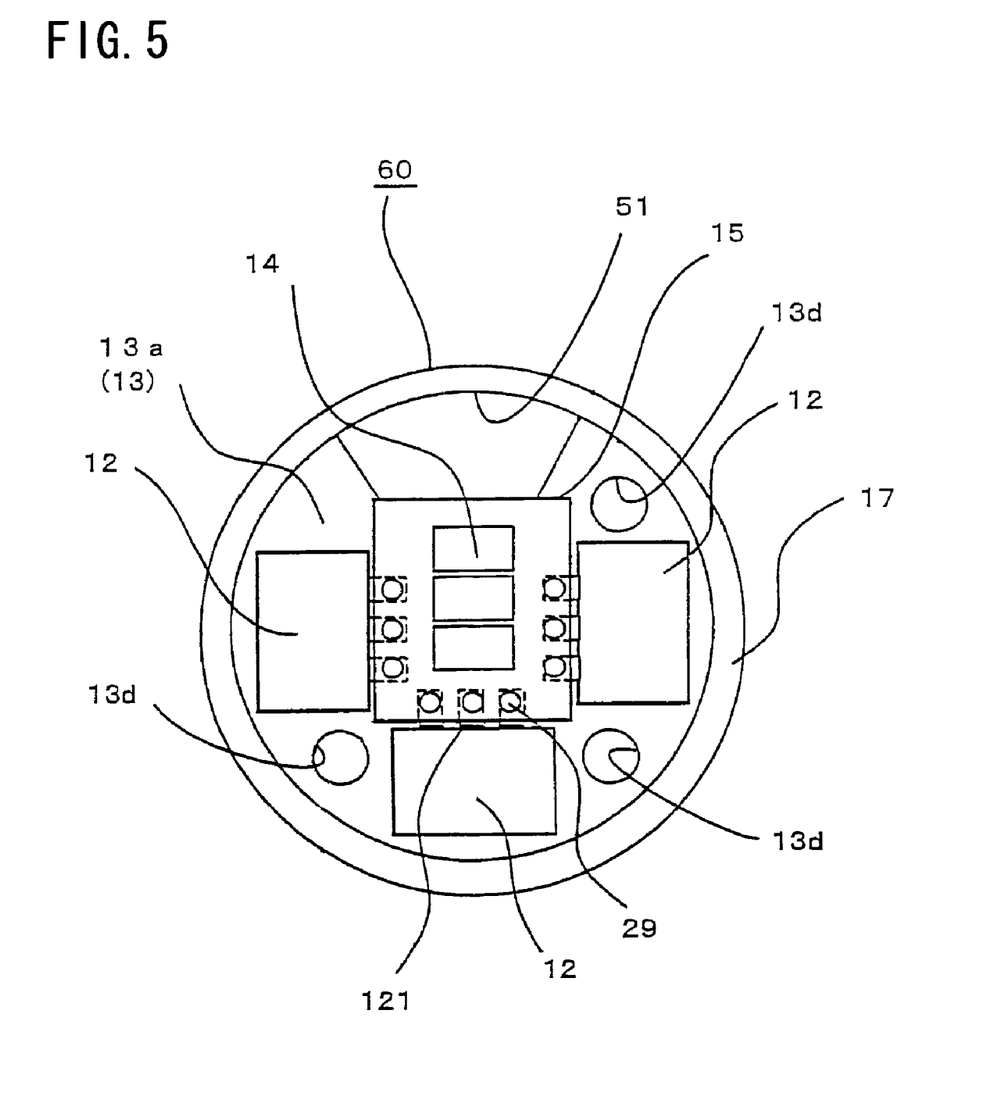
FIG. 5 is a plan view showing a positional relation of switching devices and smoothing capacitors.
Figure 6:
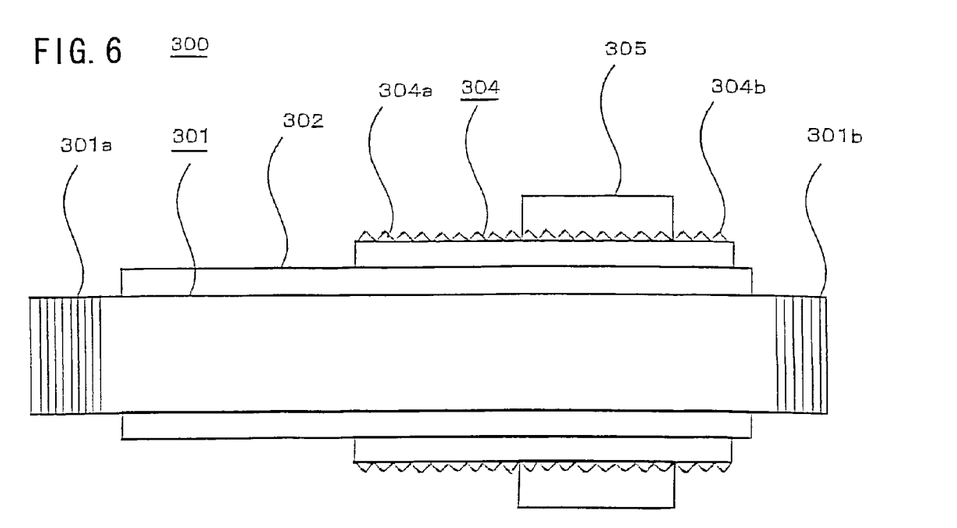
FIG. 6 is a detailed configuration diagram of conductive studs.
Figure 7:
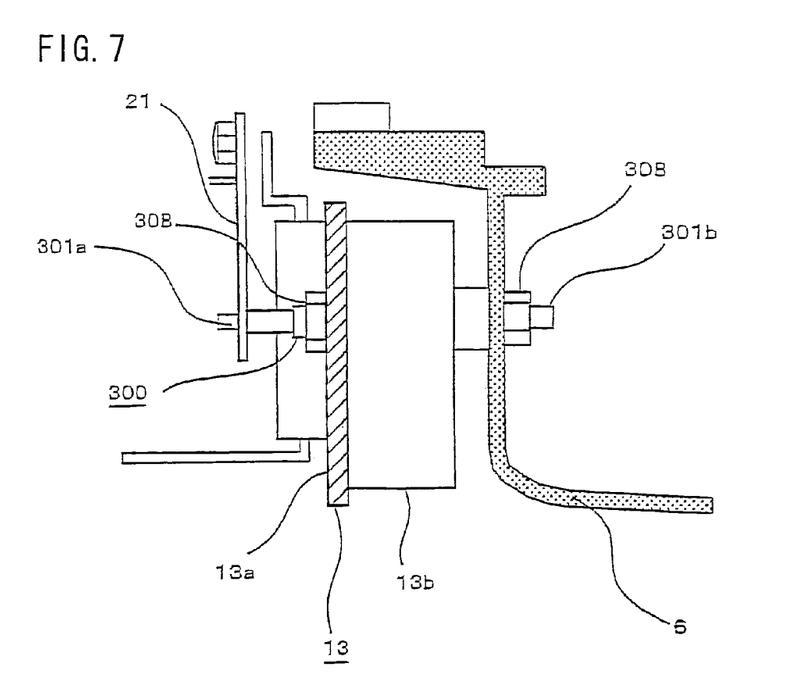
FIG. 7 is an enlarged view of a fixing part where the heat sink of the control device is attached to a rear bracket.
Figure 8:
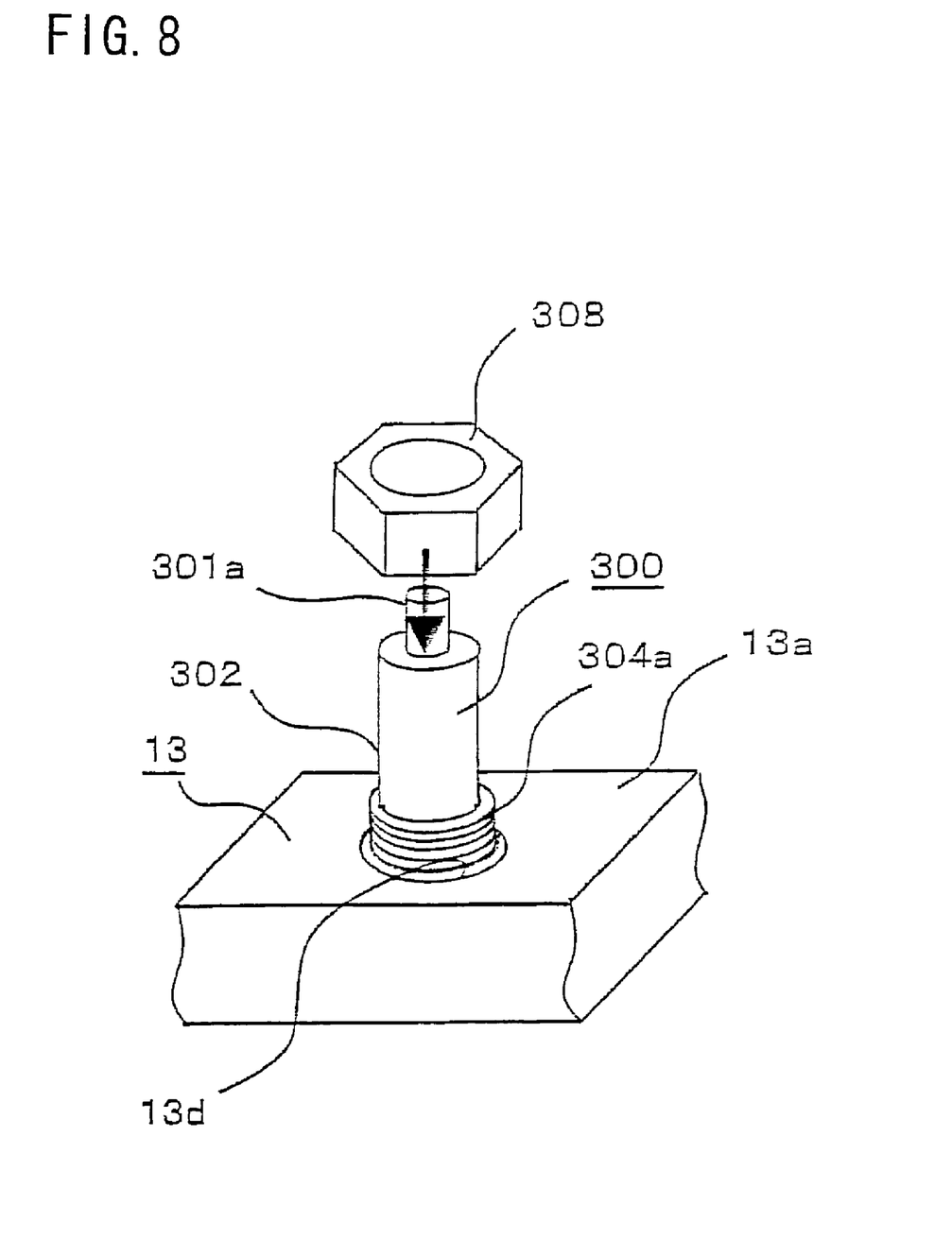
FIG. 8 is an explanatory view for explaining work for fixing the conductive studs to the heat sink.
Figure 9:
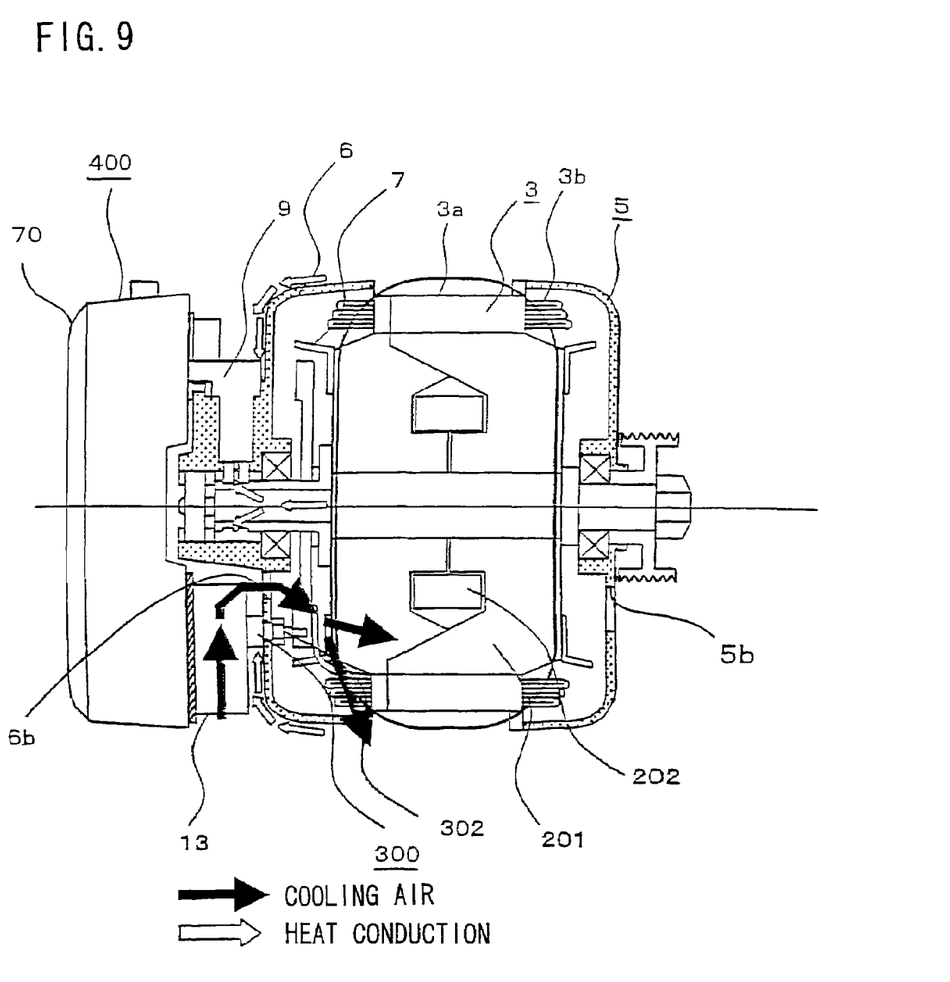
FIG. 9 is an explanatory view showing flows of heat and cooling air through the rear bracket.
Figure 10:
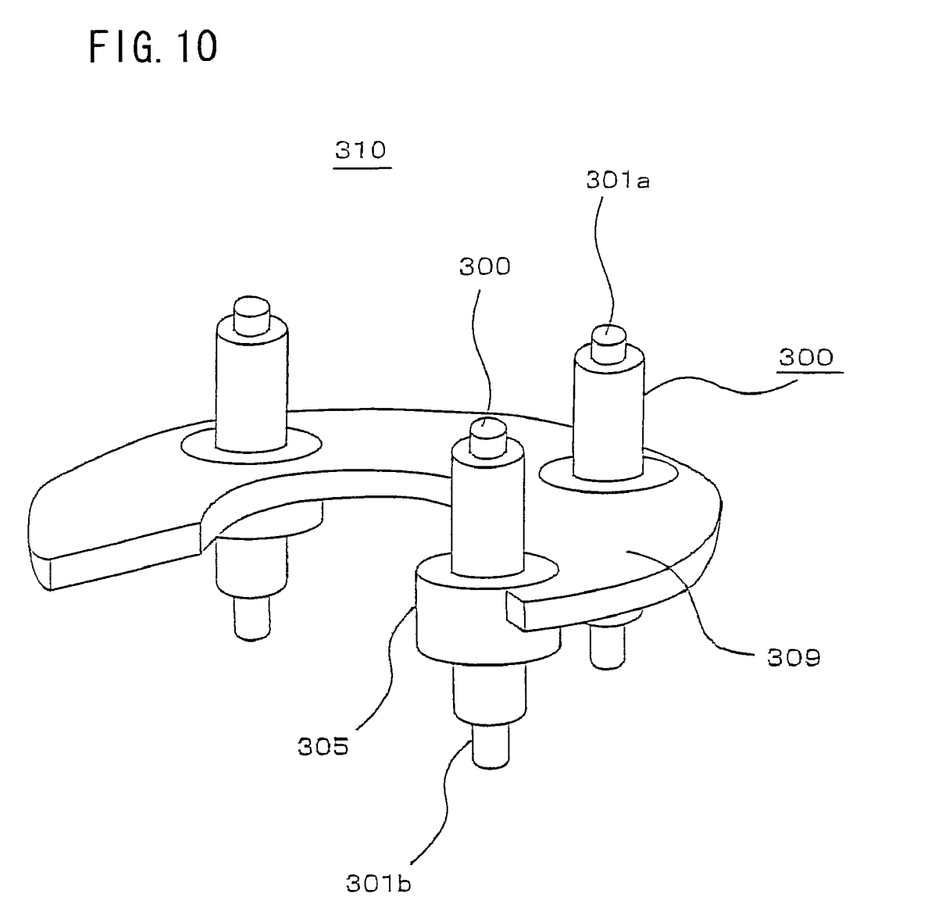
FIG. 10 is a perspective view showing a conductive stud assembly according to a variation of the first embodiment.

FIGS. 1 to 10 illustrate a first embodiment of the present invention, in which FIG. 1 is a fragmentary cross-sectional view showing the configuration of a rotating electric machine with a built-in control device, FIG. 2 is a cross-sectional view showing the detailed configuration of the control device of FIG. 1, FIG. 3 is a plan view of a heat sink and a surrounding area to a heat sink, FIG. 4 is a plan view of the heat sink, FIG. 5 is a plan view showing a positional relation of switching devices and smoothing capacitors, FIG. 6 is a detailed configuration diagram of conductive studs, FIG. 7 is an enlarged view of a fixing part where the heat sink of the control device is attached to a rear bracket, FIG. 8 is an explanatory view for explaining work for fixing the conductive studs to the heat sink, FIG. 9 is an explanatory view showing flows of heat and cooling air through the rear bracket, and FIG. 10 is a perspective view showing a conductive stud assembly according to a variation of the present embodiment.

Referring to FIG. 1, a stator 3 includes a stator core 3a provided with unillustrated slots formed in a cylindrical inner part and stator coils 3b fitted in the slots in the stator core 3a to configure polyphase alternating current (AC) windings. Two aluminum die-cast brackets 5, 6, one disposed on a load side and the other on a side opposite the load side, are fixed to the stator 3, as if sandwiching the stator 3 in an axial direction of a later-described rotor 200. The front bracket 5 on the load side and the rear bracket 6 on the side opposite the load side are hereinafter referred to as the front bracket and the rear bracket, respectively. Bearings 35, 36 are press-fitted in the front and rear brackets 5, 6, respectively. At an outer left-hand part of the rear bracket 6, there is formed a brush holder retaining part 6c as an integral part of the rear bracket 6 by aluminum die-casting, and a brush holder 9 is accommodated in the brush holder retaining part 6c. An end portion 9a of the brush holder 9 is inserted into a later-described accommodating case 70. In the front and rear brackets 5, 6, there are formed through holes 5b, 6b, respectively, for drawing in cooling air into a main body of the rotating electric machine and letting the air out after cooling the interior thereof.

The rotor 200 is of a so-called claw-pole type having a pair of poles 201 securely fixed to a main shaft 1 and field coils 202 wound around the poles 201, the rotor 200 being rotatably supported by the front and rear brackets 5, 6 via the bearing 35, 36. At a left end of the rotor 200, there is securely fixed a fan 7 which rotates together with the rotor 200. Unillustrated brushes held by the brush holder 9 and a sliding slip ring 8 are fixed to the main shaft 1 at the side opposite the load side (or the left side of FIG. 1), whereby the field coils 202 receive currents externally supplied through the slip ring 8 and the brushes.

A rotation sensor 28 for detecting the number of revolutions of the main shaft 1 is mounted on the outside of the rear bracket 6. The control device 400 for controlling currents supplied to the stator coils 3b is mounted on the outside of the rear bracket 6 in the axial direction thereof. The detailed configuration of the control device 400 is now described in the following. Shown in FIG. 3 is a state of the switching devices 12 attached to the heat sink 13 as viewed schematically from the left side of FIG. 2. As depicted in FIG. 4, the heat sink 13 includes a fanlike plate portion 13a made by cutting part of a disk, the plate portion 13a having radiating fins 13b integrally formed in a radial pattern by an aluminum die-casting method. There are formed through holes 13d in the heat sink 13. Returning to FIGS. 2 and 3, the heat sink 13 is combined with a resin member 17, together forming a dishlike base 60 shaped like a shallow circular petri dish as a whole.

As shown in FIG. 3, three switching devices 12 for controlling AC power supplied to the stator coils 3b are attached to the heat sink 13 with spacings in a circumferential direction in such a manner that heat is sufficiently conducted to the heat sink 13 and the switching devices 12 are electrically insulated therefrom. The heat sink 13 and the resin member 17 of the dishlike base 60 are cut out as shown in FIGS. 2 and 3 to form a window 51 through which the end portion 9a of the brush holder 9 is inserted.

As shown in FIG. 5, a capacitor board 15 is disposed at a central part of the dishlike base 60 and the three switching devices 12 are arranged in a radial pattern around the capacitor board 15. The smoothing capacitors 14 are mounted on the capacitor board 15 and connected to through electrode portions 29 of the capacitor board 15 via unillustrated strip conductors. Main terminals 121 of the switching devices 12 are fastened to the aforementioned through electrode portions 29 together with end portions of bus bars 21 at one side thereof. End portions of the bus bars 21 at the opposite side thereof are securely fastened to the conductive studs 300 (which will be later described in detail).

A control circuit board 16 is disposed to the left of the smoothing capacitors 14 as illustrated in FIG. 2, or on the outside of the smoothing capacitors 14 in the axial direction of the main. Electronic components, such as an IC and a transistor, are mounted on the control circuit board 16. Signal terminals 122 (FIG. 2) through which the switching devices 12 are driven or sensing outputs are taken out from inside the devices are provided on the control circuit board 16.

The conductive studs 300 which are composite conductors each include a double-end stud 301 made of a copper alloy with externally threaded parts 301a, 301b formed on both end portions, a resin shield 302 disposed on an outer periphery of the double-end stud 301 to provide insulation, and a cylindrical metal sleeve 304 of which outer periphery is externally threaded, the metal sleeve 304 being integrally fixed to the outside of the resin shield 302 as illustrated in FIG. 6. Further, a spacer member 305 having a specific length is disposed on the outside of each metal sleeve 304 in such a manner that externally threaded parts 304a, 304b are exposed at both ends of each metal sleeve 304, the spacer member 305 being formed of a material having a good thermal insulating property. The externally threaded part 301a at one end of each double-end stud 301 is inserted into the heat sink 13 through one of the through hole forming parts 13d formed therein and the three conductive studs 300 are fixed by tightening metallic nuts 308 onto the externally threaded parts 304a of the individual metal sleeves 304 as illustrated in FIG. 8.

The bus bars 21 are connected to the switching devices 12 as the bus bars 21 are fixed by tightening unillustrated nuts on the externally threaded parts 301a of the three conductive studs 300 as shown in FIG. 7. An electrode terminal portion 18 for feeding electricity from an unillustrated battery is fixed to the resin member 17 constituting the dishlike base 60. A metallic cover 19 is fitted onto the dishlike base 60 from the left side of FIG. 2, whereby the accommodating case 70 is formed to protectively accommodate the switching devices 12, the capacitor board 15 on which the capacitors 14 are mounted, and the control circuit board 16.

The accommodating case 70 assembled in the aforementioned manner is fixed as illustrated in FIGS. 1 and 2 by inserting the externally threaded parts 304b of the metal sleeves 304 of the three conductive studs 300 into respective through holes formed in the rear bracket 6 and tightening metallic nuts 308 onto the externally threaded parts 304b of the individual metal sleeves 304. At this time, there is formed a particular spacing between the heat sink 13 and the rear bracket 6 by the spacer members 305 provided on the conductive studs 300.

Direct current (DC) power is supplied from the battery to the switching devices 12 parallel-connected to the smoothing capacitors 14 via the electrode terminal portion 18 provided on the resin member 17 and converted into AC power having a desired frequency and voltage. The AC power is then supplied from the main terminals 121 of the switching devices 12 to the stator coils 3b via the bus bars 21, the conductive studs 300 and interconnect conductors 10 (refer to FIG. 1) provided within the main body of the rotating electric machine.

The main body of the rotating electric machine generates heat due to copper loss and iron loss occurring in the rotor 200 and the stator 3. As the fan 7 attached to the rotor 200 rotates, cooling air is introduced into the main body of the rotating electric machine in contact with the radiating fins 13b of the heat sink 13 and by way of the through holes 6b in the rear bracket 6 as shown by black arrows of FIG. 9 to cool the rotor 200 and the stator 3. However, part of the generated heat is conducted through the rear bracket 6 and the main shaft 1 and reaches an outside surface of the rear bracket 6 as shown by white arrows. If the rotating electric machine is used for starting an engine of a motor vehicle or for driving another onboard rotating electric machine, for example, the rear bracket 6 may reach a temperature exceeding an ordinary permissible temperature (e.g., 150° C.) of the switching devices 12 in certain cases.

However, since the heat sink 13 is fixed to the rear bracket 6 with the spacer members 305 placed in between, there is formed the particular spacing between the heat sink 13 and the rear bracket 6 so that conducted heat and radiant heat are interrupted and the radiating fins are cooled by the cooling air as mentioned above. It is therefore possible to suppress temperature increase of the control device. Also, since the capacitor board 15 is disposed on the outside of the switching devices 12 in the axial direction of the main shaft 1 and the control circuit board 16 is disposed further on the outside in the axial direction, it is possible to reduce an area necessary for these components 12, 15, 16. Additionally, the control circuit board 16 which is most susceptible to heat is mounted at an outermost position (leftmost position as illustrated in FIG. 2) in the axial direction so that the influence of heat from the rear bracket 6 can be reduced. Furthermore, since the brush holder 9 holding the brushes which act as a noise source is accommodated in the brush holder retaining part 6c of the rear bracket 6, the brush holder retaining part 6c made of an aluminum alloy suppresses noise to the control circuit board 16, for instance, thereby improving reliability of the control device.

In the present embodiment, a layer of air between the rear bracket 6 and the heat sink 13 conducts almost no heat so that heat transfer therebetween is mostly determined by the area of contact surfaces between the spacer members 305 and the rear bracket 6. Thus, a temperature difference between the rear bracket 6 and the heat sink 13 can be increased by increasing heat transfer resistance depending on how high the temperature of the main body of the rotating electric machine increases and, more particularly, by reducing the diameter of the spacer members 305 or by employing a material having a high heat transfer resistance for the spacer members 305. It is possible to suppress temperature increase of the switching devices 12 in this fashion.

Furthermore, wirings between the switching devices 12 and the smoothing capacitors 14 are shortened by arranging the switching devices 12 around the smoothing capacitors 14 and directly connecting the main terminals 121 of the switching devices 12 to the through electrode portions 29. As no bus bars are needed between the switching devices 12 and the smoothing capacitors 14, it is possible to reduce inductance and suppress surge voltages during switching operation. Consequently, reliability of the switching devices 12 can be improved and the number of components can be reduced.

The conductive studs 300 may be attached to the rear bracket 6 as described below. FIG. 10 is a perspective view showing the conductive stud assembly according to the variation of the embodiment. The conductive stud assembly 310 is manufactured by combining three switching devices 12 into a single structure by means of a ringlike resin part 310 (sic). In this variation, the conductive studs 300 of the conductive stud assembly 310 are inserted into the through holes in the rear bracket 6 and securely fastened by the metallic nuts 308. The heat sink 13, the switching devices 12 and the capacitor board 15 are assembled to the dishlike base 60. Then, the heat sink 13 is securely fixed to the conductive studs 300. Further, the switching devices 12 and the conductive studs 300 are interconnected.

In this variation, the ringlike resin part 309 is positioned between the rear bracket 6 and the heat sink 13 and the distance between the rear bracket 6 and the heat sink 13 is determined by the axial length of the spacer members 305 including the thickness of the ringlike resin part 309. It is possible to interrupt radiant heat emitted from the rear bracket 6 toward the heat sink 13 by the ringlike resin part 309 and improve assembling efficiency by combining the conductive studs 300 for three phases into a single structure.

Second Embodiment

Figure 11:
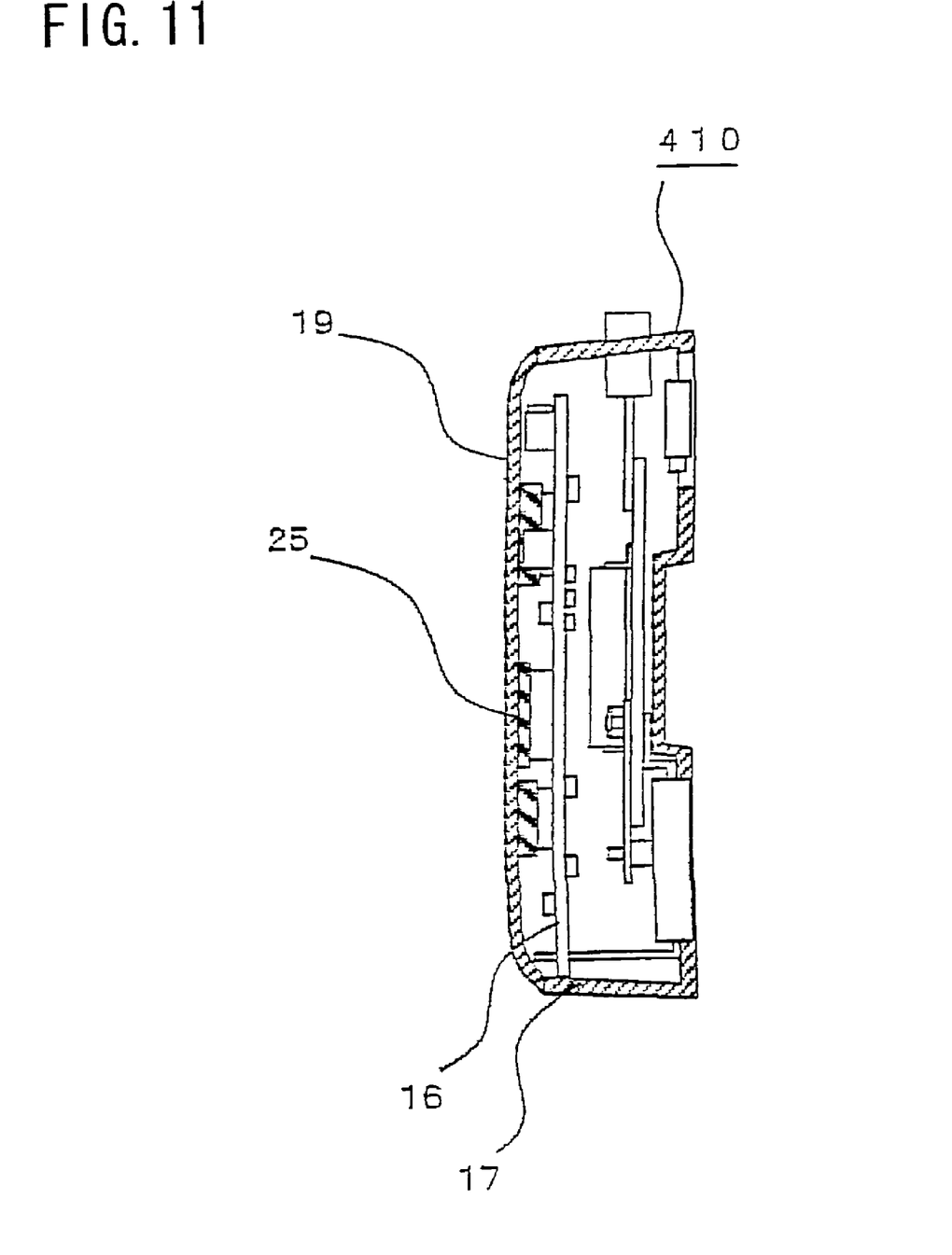
FIG. 11 is a cross-sectional view showing the configuration of a control device according to a second embodiment of the present invention.
Figure 12:
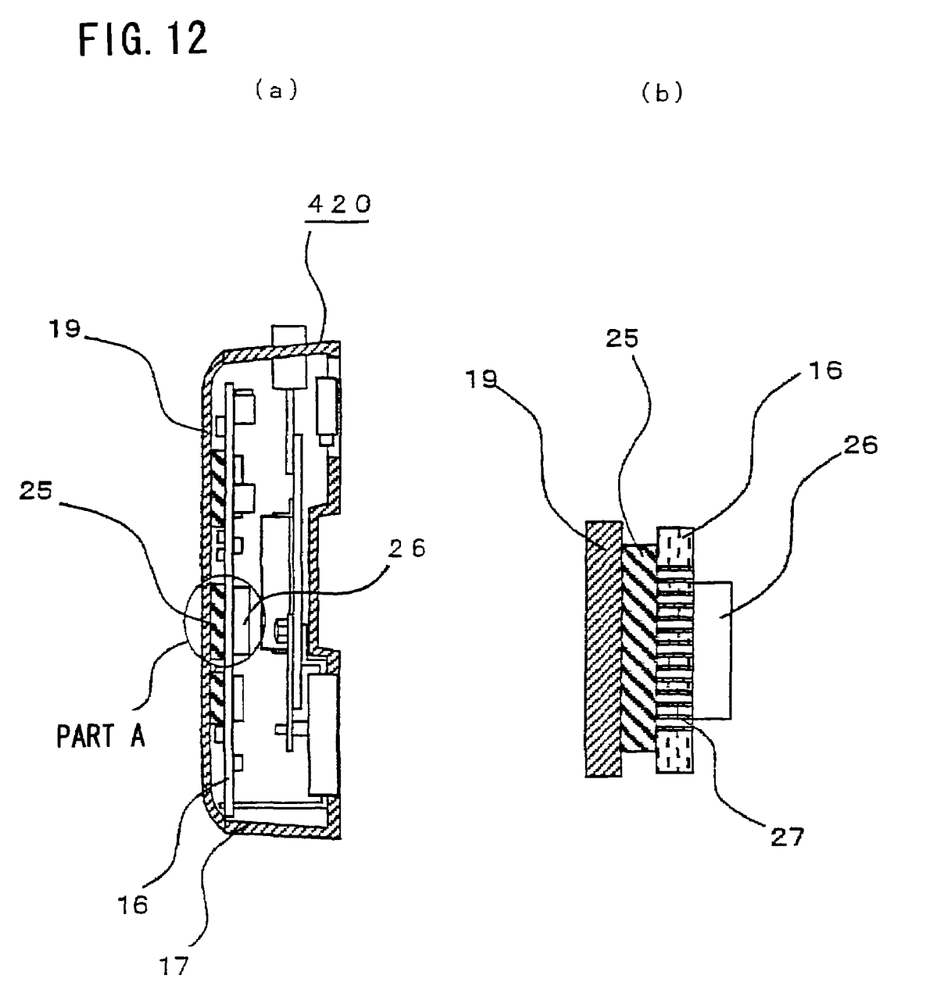
FIG. 12 is a diagram showing the configuration of a variation of the control device of FIG. 11, FIG. 12(a) being a cross-sectional view of the control device and FIG. 12(b) being an enlarged view of a part A of FIG. 12(a)
Figure 13:
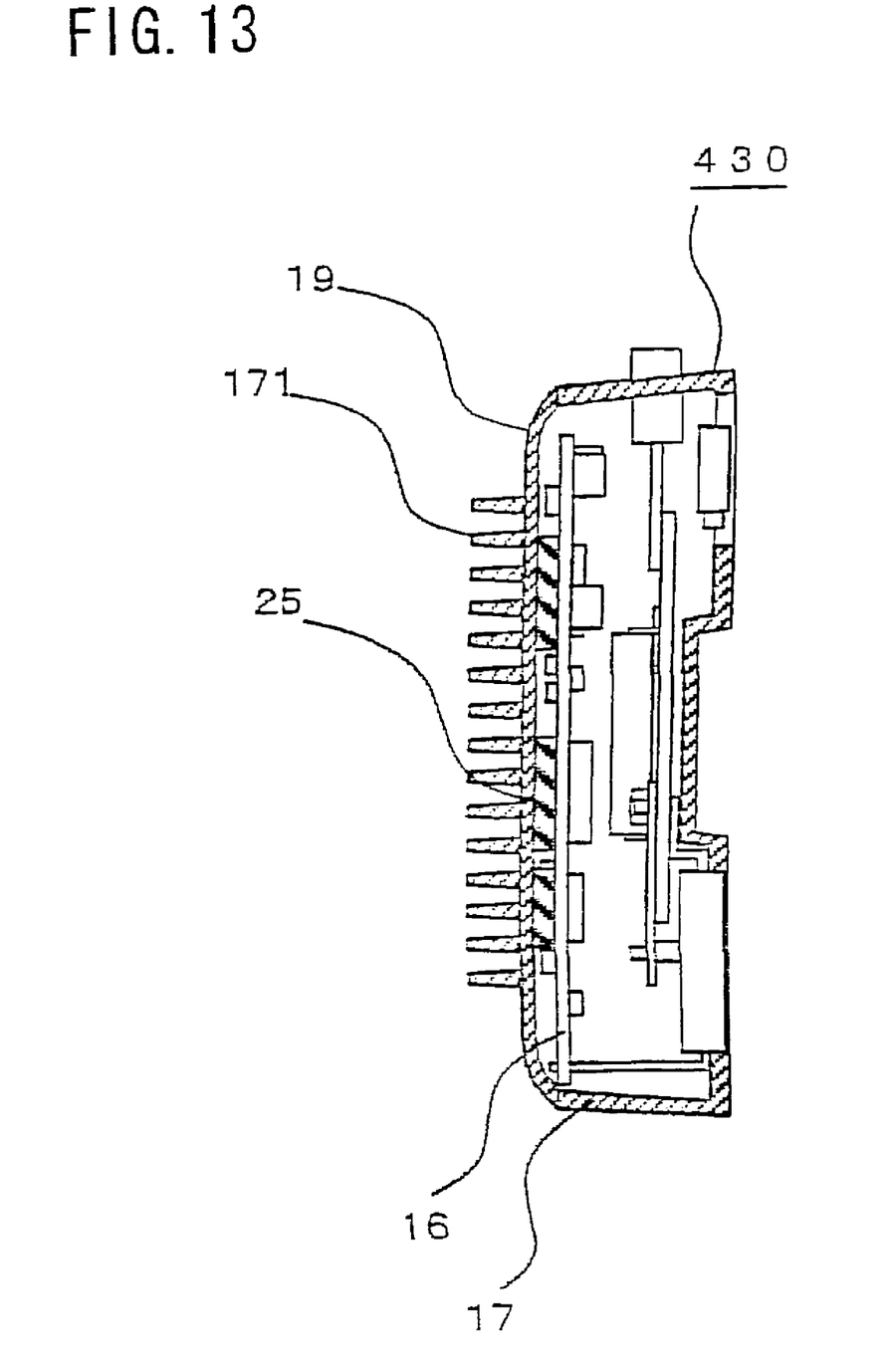
FIG. 13 is a cross-sectional view showing the configuration of another variation of the control device of FIG. 11.

FIGS. 11 to 13 illustrate another embodiment of the present invention, in which FIG. 11 is a cross-sectional view showing the configuration of a control device, FIG. 12 is a diagram showing the configuration of a variation of the control device of FIG. 11, FIG. 12(a) being a cross-sectional view of the control device and FIG. 12(b) being an enlarged view of a part A of FIG. 12(a), and FIG. 13 is a cross-sectional view showing the configuration of another variation of the control device of FIG. 11. A control circuit board 16 includes components which generate a great deal of heat, such as a transistor of a power supply circuit, a driver IC for driving switching devices 12 and a microcomputer for performing mathematical processing. It is preferable that these components be distributedly arranged as much as possible. As shown in the control device 410 of FIG. 11 or the control device 420 of FIG. 12, heat-conducting resin sheets 25 are placed between those components and a metallic cover 19 or between those components and the control circuit board 16 and the cover 19, whereby heat generated by those components or the control circuit board 16 is transferred to the cover 19 by way of the resin sheets 25 and dissipated. This makes it possible to efficiently cool those components and the control circuit board 16.

In particular, in the case of electronic components having a heat spreader on a rear side of a package, a structure which dissipates heat generated by the electronic components through the control circuit board 16 is preferable. Here, a heat radiating path in the control device 420 is explained by using FIG. 12(b) which is a partially enlarged view of FIG. 12(a). An electronic component 26 having a heat spreader is soldered onto a conductor pattern A on one side of the control circuit board 16, the conductor pattern A having approximately the same area as the heat spreader. The conductor pattern A is connected to a conductor pattern B on the other side of the control circuit board 16 by way of via holes 27 formed in a substrate of the control circuit board 16. A resin sheet 25 is placed between the conductor pattern B and the cover 19 in such a manner that the resin sheet 25 is tight contact with both the conductor pattern B and the cover 19. Compared to a substrate material of the control circuit board 16, copper patterns forming the via holes have higher thermal conductivity and provide good heat conduction from the heat spreader of the heat-generating component, so that the heat generated by the electronic component on a rear side of the control circuit board 16 can be effectively radiated.

Further, a control device 430 can produce yet enhanced heat radiation performance by providing fins 171 on the outside of the cover 19 which is held in contact with the control circuit board 16 via resin sheets 25 as shown in FIG. 13. Whether the fins 171 need to be installed, as well as fin height and the area of a base portion of the fins 171, may be determined in consideration of a temperature increase of an electronic component due to heat generation thereof and a balance between a temperature increase of the control circuit board 16 and a permissible temperature thereof. As shown in FIG. 2, the outside of the cover 19 is located at a position most separated from heat-generating parts of the main body of the rotating electric machine, such as the stator 3 and the rotor 200, and the fan 7 attached to the rotor 200 cools the radiating fins 13b and draws in airflow into the interior of the main body of the rotating electric machine by way of the through holes 6b in the rear bracket 6. Consequently, the airflow heated by the main body of the rotating electric machine does not come into contact with an outside part of the cover 19. Therefore, the airflow at the lowest temperature come into contact with the outside part of the cover 19 at all times. This is advantageous for cooling the control circuit board 16 which is particularly sensitive to heat.

As thus far described, rotating electric machines with a built-in control device according to the aforementioned embodiments including, in particular, rotating electric machines for installation on a vehicle used under high-temperature conditions can be structured such that the control device is thermally insulated from the main body of the rotating electric machine in an effective fashion. Accordingly, heat is almost never transmitted from a rear side of the rear bracket to the heat sink even when ambient temperature in an area, such as an engine room, where the main body of the rotating electric machine is installed increases or the amount of heat generated by the main body of the rotating electric machine increases. It is therefore possible to prevent heat damage to components with a simple structure without causing temperature increase of the switching devices or the control circuit board.

Also, as the control circuit board which is relatively sensitive to heat is disposed at an outermost location most separated from the main body of the rotating electric machine which is a heat-generating part, and the heat radiating path and the fins for dissipating heat generated by the control board are disposed at a location most separated from the main body of the rotating electric machine, it is possible to cool the control circuit board most efficiently without the influence of the heat generated by the main body of the rotating electric machine.

While the foregoing discussion of the individual embodiments has illustrated examples in which cooling air is drawn into the main body of the rotating electric machine by the fan 7, the embodiments of the invention produce the same effects when applied to a rotating electric machine of a totally enclosed fan-cooled type or other type as well. The embodiments also produce the same effects even when the rotating electric machine is a generator, a generator-motor, a starter, a power-assisted generator-motor or of other types.

As thus far discussed, a rotating electric machine with a built-in control device according to the present invention includes a main body of the rotating electric machine including a stator, a rotor having a rotary shaft, brackets provided on both sides of the stator, one on a load side and the other on a side opposite the load side, for rotatably supporting the rotor via the rotary shaft, and a fan which is provided on the rotor and rotates together with the rotor to induce a flow of cooling air for cooling at least one of the stator and the rotor, and the control device including control components for controlling the main body of the rotating electric machine, the control device being fixed to the outside of the bracket on the side opposite the load side in an axial direction of the rotary shaft in such a manner that a particular spacing is formed between the control device and the bracket on the side opposite the load side and the flow of cooling air passes through this spacing. Thus, by providing the spacing between the control device and the bracket on the side, it is possible to suppress heat transfer from the bracket on the side opposite the load side and effectively cool the control device by the flow of cooling air.

The rotating electric machine with the built-in control device is characterized in that the control device includes a heat sink for dissipating heat of the control components, wherein the heat sink is fixed with the particular spacing provided between the heat sink and the bracket on the side opposite the load side and is cooled by the flow of cooling air. It is therefore possible to effectively cool the control components through the heat sink.

Furthermore, the rotating electric machine with the built-in control device is characterized in that the stator includes polyphase AC windings, and the control device includes as the control components a switching device for converting a DC input into an AC output and supplying the AC output to the polyphase AC windings, the heat sink for cooling this switching device, a capacitor connected to the DC input side of the switching device, and a control circuit board having a control circuit for controlling the switching device, wherein the control circuit board and the heat sink are so disposed as to overlap each other in the axial direction of the rotary shaft, and the heat sink is fixed to the bracket on the side opposite the load side in such a manner that the heat sink is cooled by the flow of cooling air. Thus, it is possible to lessen temperature increase of the control circuit board by separating the control circuit board further away from the bracket on the side opposite the load side than the heat sink.

Also, the rotating electric machine with the built-in control device is characterized in that the control circuit board is fixed to the bracket on the side opposite the load side with spacers placed between the heat sink and the bracket on the side opposite the load side to maintain the particular spacing. It is therefore possible to easily maintain the spacing.

Further, the rotating electric machine with the built-in control device is characterized in that the control device supplies the AC output to the polyphase AC windings via a plurality of conductors, the control device is provided with composite conductors each of which is made by combining one of the spacers and one of the conductors into a single structure, the conductors are passed through the heat sink and the bracket on the side opposite the load side, and the heat sink is fixed to the bracket on the side opposite the load side by the composite conductors in such a manner that the spacers maintains the particular spacing. It is therefore possible to reduce the number of components.

Furthermore, the rotating electric machine with the built-in control device is characterized in that the conductors are rodlike conductors, and each of the composite conductors includes an insulating shield member covering an outer periphery of the conductor, a cylindrical thread member mounted on an outer peripheral side of the insulating shield member, the thread member having an externally threaded part, and an annular member having a specific length along an axial direction of the conductor, the annular member being disposed in such a manner that the externally threaded part on an outer periphery of the thread member remains disposed on both sides along the axial direction of the conductor, wherein one end portion of the externally threaded part left disposed is passed through the heat sink and a nut is screwed onto the one end portion of the externally threaded part to fasten the heat sink between the nut and the annular member while the other end portion of the externally threaded part left disposed is passed through the bracket on the side opposite the load side and another nut is screwed onto the other end portion of the externally threaded part to fasten the bracket on the side opposite the load side, whereby the heat sink is fixed to the bracket on the side opposite the load side in such a manner that the annular member is positioned as the spacer between the heat sink and the bracket on the side opposite the load side. It is therefore possible to reduce the number of components.

Also, the rotating electric machine with the built-in control device is characterized in that the control device is such that the switching device is arranged to be positioned approximately on the circumference of a circle having a specific diameter centered around the axis of the rotary shaft and the capacitor is arranged at a central part of the circle. It is therefore possible to reduce inductance by shortening the length of wiring between the capacitor and the switching device and suppress surge voltages during switching operation.

Additionally, the rotating electric machine with the built-in control device is characterized in that the control device includes a cover covering the control circuit board from the axial direction of the rotary shaft and a heat-conducting member disposed between the control circuit board and the cover for conducting heat therebetween. It is therefore possible to effectively dissipate heat generated by the control circuit board.

DESCRIPTION OF THE SYMBOLS 1 main shaft, 3 stator, 6 rear bracket, 7 fan, 12 switching device, 13 heat sink, 14. capacitor, 15 capacitor board, 16 control circuit board, 19 cover, 25 resin sheet, 200 rotor, 300 conductive stud, 304 metal sleeve, 305 spacer member, 400, 410, 420, 430 control device

The invention claimed is:

1. A rotating electric machine with a built-in control device comprising:
a main body of the rotating electric machine including:
a stator;
a rotor having a rotary shaft;
brackets provided on both sides of said stator, one on a load side and the other on a side opposite the load side, for rotatably supporting said rotor via said rotary shaft; and
a fan which is provided on said rotor and rotates together with said rotor to induce a flow of cooling air for cooling at least one of said stator and said rotor; and
the control device including control components for controlling said main body of the rotating electric machine, said control device being fixed to the outside of the bracket on said side opposite the load side in an axial direction of said rotary shaft in such a manner that a particular spacing is formed between said control device and the bracket on said side opposite the load side and said flow of cooling air passes through this spacing.

2. The rotating electric machine with the built-in control device as recited in claim 1, wherein said control device includes a heat sink for dissipating heat of said control components, and said particular spacing being provided between said heat sink and the bracket on said side opposite the load side, said heat sink being cooled by said flow of cooling air.

3. The rotating electric machine with the built-in control device as recited in claim 2, wherein said stator includes polyphase AC windings, and said control device includes as said control components:
a switching device for converting a DC input into an AC output and supplying said AC output to said polyphase AC windings;
said heat sink for cooling this switching device;
a capacitor connected to said DC input side of said switching device; and
a control circuit board having a control circuit for controlling said switching device;
wherein said control circuit board and said heat sink are so disposed as to overlap each other in the axial direction of said rotary shaft, and said heat sink is fixed to the bracket on said side opposite the load side in such a manner that said heat sink is cooled by said flow of cooling air.

4. The rotating electric machine with the built-in control device as recited in claim 3, wherein said control circuit board is fixed to the bracket on said side opposite the load side with spacers placed between said heat sink and the bracket on said side opposite the load side to maintain said particular spacing.

5. The rotating electric machine with the built-in control device as recited in claim 4, wherein said control device supplies said AC output to said polyphase AC windings via a plurality of conductors, said control device is provided with composite conductors each of which is made by combining one of said spacers and one of said conductors into a single structure, said conductors are passed through said heat sink and the bracket on said side opposite the load side, and said heat sink is fixed to the bracket on said side opposite the load side by said composite conductors in such a manner that said spacers maintains said particular spacing.

6. The rotating electric machine with the built-in control device as recited in claim 5, wherein said conductors are rodlike conductors, and each of said composite conductors includes an insulating shield member covering an outer periphery of said conductor, a cylindrical thread member mounted on an outer peripheral side of said insulating shield member, said thread member having an externally threaded part, and an annular member having a specific length along an axial direction of said conductor, said annular member being disposed in such a manner that said externally threaded part on an outer periphery of said thread member remains disposed on both sides along the axial direction of said conductor, wherein one end portion of said externally threaded part left disposed is passed through said heat sink and a nut is screwed onto said one end portion of said externally threaded part to fasten said heat sink between said nut and said annular member while the other end portion of said externally threaded part left disposed is passed through the bracket on said side opposite the load side and another nut is screwed onto said other end portion of said externally threaded part to fasten the bracket on said side opposite the load side, whereby said heat sink is fixed to the bracket on said side opposite the load side in such a manner that said annular member is positioned as said spacer between said heat sink and the bracket on said side opposite the load side.

7. The rotating electric machine with the built-in control device as recited in claim 3, wherein said switching device is arranged to be positioned approximately on the circumference of a circle having a specific diameter centered around the axis of said rotary shaft and said capacitor is arranged at a central part of said circle.

8. The rotating electric machine with the built-in control device as recited in claim 3, wherein said control device further includes a cover covering said control circuit board from the axial direction of said rotary shaft and a heat-conducting member disposed between said control circuit board and said cover for conducting heat therebetween.

9. The rotating electric machine with the built-in control device as recited in claim 1, further including a spacer disposed between the control device and the bracket on said side opposite the load side, the spacer providing the particular spacing.

* * * * *